Jan. 24, 1950 E. J. SHIMEK 2,495,390
SEISMOGRAPH GAIN CONTROL SYSTEM
Filed March 20, 1946 2 Sheets-Sheet 1
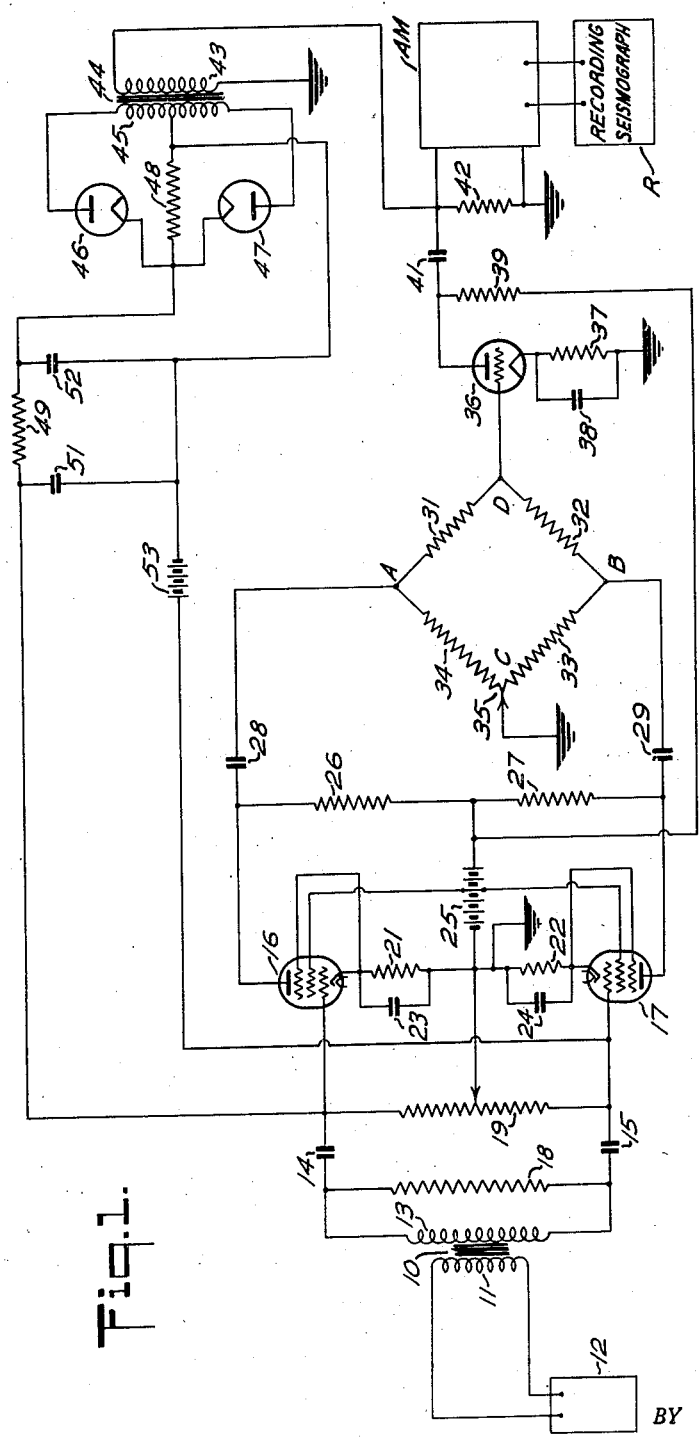
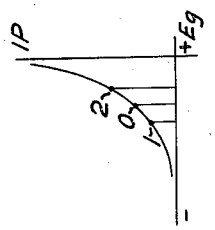
INVENTOR.
EDWIN J. SHIMEK
BY
Sidney A. Johnson
ATTORNEY

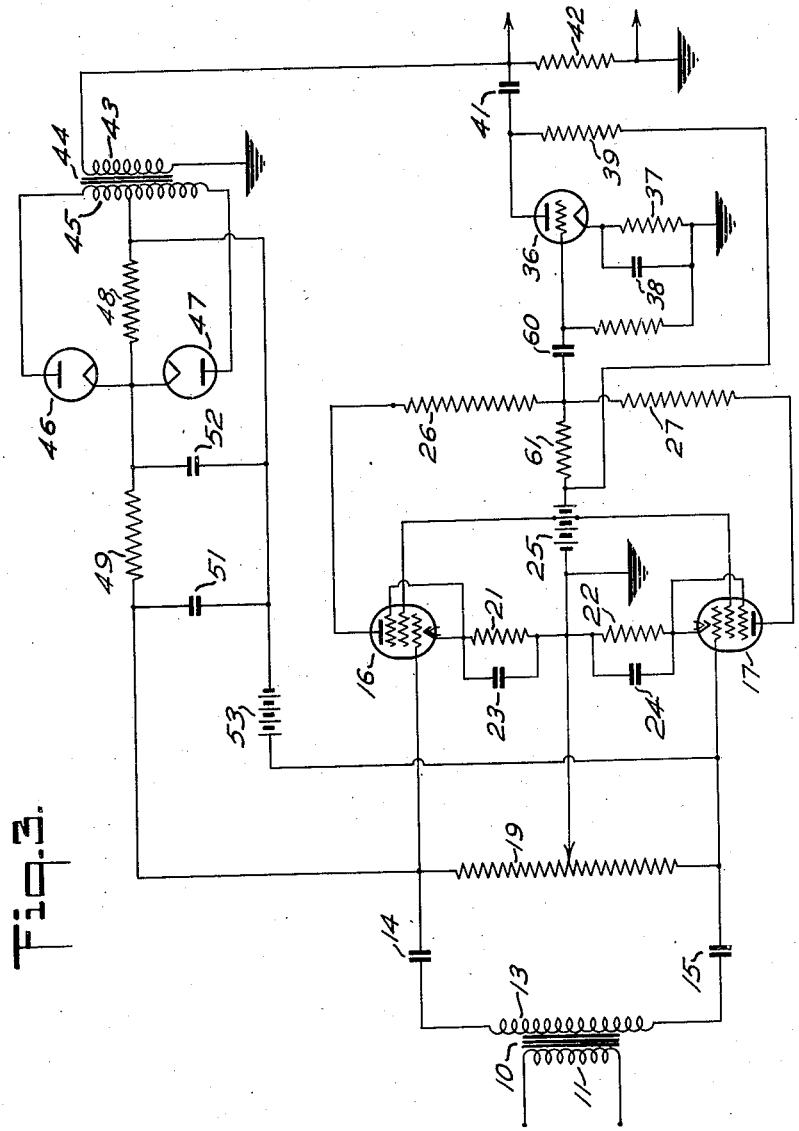

Patented Jan. 24, 1950

2,495,390

UNITED STATES PATENT OFFICE 2,495,390

SEISMOGRAPH GAIN CONTROL SYSTEM

Edwin J. Shimek, Dallas, Tex., assignor, by mesne assignments, to Socony-Vacuum Oil Company, Incorporated, New York, N. Y., a corporation of New York Application March 20, 1946, Serial No. 655,659

2 Claims. (Cl. 179—171)

The present invention relates to a control circuit for amplifiers, and more particularly to a signal control circuit for use with electric seismographs.

In seismic prospecting systems, it is customary to detonate a charge of explosive in a shot hole to produce artificial seismic waves which are reflected from sub-surface horizons or interfaces. As these waves travel through the underground strata, they are attenuated so that the waves reflected from the deeper interfaces are of lesser amplitude. The attenuation of the waves depends upon the distance traveled and also upon the different densities in the sub-surface strata.

The reflected seismic waves are picked up at a plurality of spaced points remote from the shot hole by detectors or geophones arranged in a pattern generally referred to as a "spread." The reflected waves reach the different geophones at different times, and different interfaces cause a different series of reflections to reach the geophones so that a recording of the reception of such waves by a seismic oscillograph will provide data from which computations may be made to plot the sub-surface strata and contour of the interfaces.

The time of arrival of the first wave is ascertained by the beginning of the movement of the oscillograph element from its neutral position. In order to facilitate determination of the initial movement of the oscillographic element with reasonable accuracy, it has been customary to have the amplifier set for maximum gain. With the amplifier set for maximum gain, the initial movement of the galvanometer or oscillographic element produces a sharp break in the seismogram, thereby minimizing the necessity to estimate the precise instant at which the oscillographic element first began to move.

Subsequent to the initial direct wave, a series of reflected waves are received which over a period of time are progressively attenuated. The first reflected waves are of higher amplitude than succeeding reflected waves, so that it has been customary to reduce the gain of the amplifier for the first reflected waves and subsequently to increase the gain of the amplifier as a function of time. It has been found, however, that increasing the gain of the amplifier as a function of time by a modified gain control circuit operating in a manner analogous to the automatic volume control of radio receivers introduces a modulation or distortion of the received waves.

In radio receiver, the audio or radio frequencies are at a frequency which is relatively high compared to the low frequency of operation of the automatic gain control voltage. In seismographic recording, however, the seismic signals are quite low in frequency and are comparable to the undesired signal inherently resulting from variation of the gain control voltage. In radio receivers, a simple filter arrangement will substantially eliminate the unwanted signal from the output, but a simple filter circuit will not eliminate the undesired signal from the amplifier output in a seismographic apparatus. It, therefore, would be desirable to provide a signal control for the amplifier which would provide a wide variation of the control of the amplitude of the signal to be recorded with minimum modulation of the signal control voltage.

In accordance with the present invention, an electronic attenuation or signal control is obtained for operation in connection with a seismographic amplifier by means of a circuit which varies the magnitude of signals transmitted thereby without greatly affecting the potentials applied to the amplifier circuit. This is accomplished by the use of a symmetrical circuit which may be unbalanced by a small control voltage so as to control the signal amplitude from a limiting value of zero to the maximum.

It is, therefore, an object of the present invention to provide an improved control circuit for controlling the amplitude of transmitted signals.

It is a further object of the present invention to provide an improved signal transmission circuit for controlling the amplitude of signals in a seismographic recording system.

Other and further objects of the present invention will become apparent from the following description taken in conjunction with the accompanying drawings, in which:

Fig. 1 is a circuit diagram of a signal control circuit constructed in accordance with the present invention;

Fig. 2 is a graph explanatory of the mode of operation; and

Fig. 3 is a circuit diagram of a modified form of the invention.

Referring to Fig. 1 of the drawing, there is shown a circuit having an input transformer 10, the primary winding 11 of which is connected to a source of seismic signals such as those picked up by a geophone 12. The secondary winding 13 of the transformer 10 has its terminals capacitively connected by capacitors 14 and 15 to the control grids of a pair of vacuum tubes 16 and 17. The secondary winding of the transformer 10 may be bridged by a resistor 18 so as to complete a circuit for the currents of the secondary winding 13 and properly to match the transformer primary to the impedance of the geophone 12. The voltage developed across the winding 13 is applied to a resistor 19 connected between the control grids of the vacuum tubes 16 and 17.

The pair of vacuum tubes 16 and 17 may be any suitable vacuum tubes although it has been found preferable for the present purposes to utilize pentodes having their suppressor grids connected to the cathodes. The cathodes are self-biased by resistors 21 and 22 connected to ground and by-passed respectively by capacitors 23 and 24. An adjustable contact on the resistor 19 is connected to the common juncture of the cathode bias resistors 21 and 22. The adjustable contact on the resistor 19 is provided for accurate balancing of the circuit and to provide the effect of a midpoint for the secondary winding 13 of the transformer 10. A source of potential 25 has its negative terminal connected to ground and to the cathodes of the vacuum tubes. An intermediate point on this source of potential 25 is connected to the screen grids of each of the vacuum tubes 16 and 17. The source of potential 25 is connected to anode resistors 26 and 27 which complete the anode circuits for the vacuum tubes 16 and 17, respectively. Those skilled in the art will recognize from the circuit thus far described a certain similarity of push-pull amplifiers of the resistance-capacitance coupled type.

The anodes of the vacuum tubes 16 and 17 are coupled by capacitors 28 and 29 to one diagonal of a bridge network formed of suitable impedances such as resistors 31, 32, 33 and 34. The resistors 33 and 34 may be combined in a single resistor having an adjustable contact 35 which is connected to ground. The common juncture between the resistors 31 and 32 is connected to the control grid of a vacuum tube 36. The cathode of the vacuum tube 36 may be self-biased by a resistor 37 connected to ground and by-passed by a capacitor 38. The anode of the vacuum tube 36 is connected through an anode resistor 39 to the source of potential 25.

The output of the vacuum tube 36 is capacitively coupled by a capacitor 41 to an input resistor 42 which may be connected to succeeding stages of amplification indicated at AM and which lead to the recording seismograph R. The upper terminal of the resistor 42 is connected to one terminal of the primary winding 43 of a transformer 44. The other terminal of the primary winding of the transformer 44 is connected to ground. The transformer 44 is provided with a midtap secondary winding 45 having its outer extremities connected to the anodes of a pair of rectifiers 46 and 47. The cathodes of the rectifiers are connected together and to one terminal of a resistor 48, the other terminal of which is connected to the midpoint of the secondary winding 45.

The output of the rectifiers 46 and 47 is connected to a resistance-capacitance filter circuit comprising the resistor 49 having at each terminal by-pass filter capacitors 51 and 52. The cathodes of the vacuum tube rectifiers 46 and 47 are connected through the resistor 49 to one terminal of the resistor 19 of the input circuit of the pair of vacuum tubes 16 and 17. The other terminal of the resistor 19 is connected through a source of potential 53 to the midpoint of the transformer secondary winding 45. The source of potential 53 is applied to the grid circuits of the vacuum tubes 16 and 17 in series with resistor 19 so as to unbalance these vacuum tubes in opposite senses.

A portion of the output of the amplifier tube 36 is supplied to the rectifiers 46 and 47 to produce rectified energy proportional to the signal output. This rectified energy flows through the resistor 49 developing a potential thereacross which is in opposition to the potential provided by the source of potential of battery 53. This therefore provides an operation which tends to reduce the amount of unbalance produced by the battery 53 in the operation of the vacuum tubes 16 and 17.

If no bias potential were supplied from the rectifier-filter network to the grid circuits of the vacuum tubes 16 and 17, it will be seen that the vacuum tubes would operate in a balanced manner corresponding to the balanced operation of Class A push-pull amplifiers. Under such an assumed condition of operation, if the current through one of the resistors such as 26 should increase, the current through the other resistor 27 would decrease. The increase and decrease would be at comparable rates so that the net change in current flow through the conductor to the battery 25 would be zero. Substantially infinite attenuation is thereby provided and it follows that any unbalance, no matter how small, will produce an output signal.

More particularly, if the operating conditions of the vacuum tubes 16 and 17 are unbalanced, the flow of currents through the resistors 26 and 27 will not be increasing and decreasing at comparable rates so that an alternating-current component will flow through the conductor extending between the common juncture of the resistors and the battery 25. Thus, the signal or alternating-current voltages developed across resistors 26 and 27 will be dissimilar and the voltage applied to the points A and B by the capacitors 28 and 29 relative to ground will be of different magnitudes, with resulting current flow through the arms of the bridge network. For example, if the alternating-current potential developed across the resistor 26 relative to ground is greater than the opposite potential developed across the resistor 27, a greater amount of current will flow through the bridge resistor 34, thereby unbalancing the bridge so that an alternating-current component will appear between the terminals CD.

In accordance with the present invention, the desired attenuation is dependent on the unbalanced condition which is deliberately obtained by the circuit which includes the source of biasing potential 53. The source of potential 53 supplies current which flows through resistors 19, 49 and 48. Thus, a voltage is developed across the resistor 19 which is applied to the grids of the vacuum tubes 16 and 17 so that the grid of one vacuum tube becomes, with respect to its cathode, more positive by a certain amount and the grid of the other vacuum tube becomes more negative by an equal amount. Under such conditions of operation, the circuit arrangement operates to supply a signal current output or voltage across the diagonal CD of the bridge network, the magnitude of which will depend on the extent of unbalance. The amplifier 36 amplifies this potential which is transmitted through the coupling capacitor 41 so that a portion of this energy is applied to the primary winding 43 of the transformer 44. Rectifier tubes 46 and 47 convert this signal energy into direct current which flows through the resistors 49 and 19, thereby developing in the resistor 19 a net potential which is less than and opposite in sense with respect to the potential developed therein due to the energy supplied by the bias battery 53. This therefore will reduce the signal output across the terminals CD, and automatic attenuation or volume control is provided; or the control bias may be derived from an RC circuit in manner well known to those skilled in the art.

Fig. 2 shows the relation between grid voltage and plate current by means of a characteristic curve. For balanced operation, both the vacuum tubes have a similar negative bias due to the action of the self-biasing resistors 21 and 22 so that they both operate at the point 0 on the curve shown in Fig. 2. The application of potential from the bias source 53, however, displaces the operating point of one of the vacuum tubes, for example the vacuum tube 16, to the point 1 on the curve and the operating point of the other vacuum tube to the point 2 on the curve. From this it is apparent that any signal thereafter impressed upon the grids of the vacuum tubes will produce unequal effects so that unequal alternating-current components are developed across the resistors 26 and 27 which are in the anode circuits of the vacuum tubes 16 and 17. With greater and greater output signal voltage, the more nearly the biasing voltage derived therefrom by the rectifier-filter network balances the fixed bias of battery 53 or equivalent, with the result the operating points 1 and 2, Fig. 2, of tubes 16 and 17 both shift toward the point 0. Thus it becomes apparent that there has been provided a circuit arangement whereby the magnitude of signal supplied to the amplifier tube 36 may be controlled. The vacuum tube 36 and those in the succeeding stages of amplification will operate in accordance with normal operating voltages, and hence the amplifier will not introduce into the signal output any component of substantial magnitude derived from the gain-control voltage.

In the description of the circuit arrangement shown in Fig. 1 of the drawings, it was stated that the primary winding 11 of the transformer 10 may be connected to a suitable source of seismic signals, such as a geophone 12. Where in seismic recording it is desired to have the seismograph make a sharp break in the trace, the gain of the amplifier is set to be at or near a maximum. In accordance with the present invention, the full effect of the bias potential 53 is permitted initially to appear across the resistor 19, thereby resulting in the maximum signal amplification or signal magnitude first appearing across the output of the amplifier AM which supplies the energy to the oscillographic elements in the seismic recording apparatus R.

It may therefore be assumed that in the application of the circuit of Fig. 1, the direct traveling wave is picked up by the geophone and transmitted by the amplifier tube 36. The maximum signal energy having been impressed upon the grid of this vacuum tube results in a maximum amount of energy being supplied to the rectifiers 46 and 47 which thereupon operate to reduce the effective bias across the resistor 19 by an appreciable amount, thereby bringing about a condition of operation corresponding to the reduction of the gain in the ordinary amplifier to a relatively low value. Thus, the amplifier is prepared for reception of the first reflected train of signals of greater amplitude as received by the geophone connected to the transformer 10. These are then supplied to the amplifier tube 36 and the succeeding stages of amplification. The signal energy of succeeding signals transmitted to the amplifier, being less than the initial energy being transmitted in response to the direct wave, will cause the rectifiers 46 and 47 to supply potential of decreasing values. As the potential developed by the rectifiers 46 and 47 decreases, the net potential across the resistor 19 increases, thereby returning the operating conditions of the vacuum tubes 16 and 17 to a greater condition of unbalance. This produces an effect corresponding to an increase in the gain of an amplifier in a conventional circuit, as far as the output of the amplifier AM and the recording apparatus R are concerned. Thus, for the subsequent and more reduced amplitude waves, that is, lower input-signal level the transmission energy level of the circuit comprising the vacuum tubes 16 and 17 and the bridge network is increased so that substantially constant signal energy is transmitted to the recording apparatus R.

A modified arrangement is illustrated in Fig. 3, wherein those parts corresponding to the components shown in Fig. 1 have been given similar reference characters. It will be noted that this circuit arrangement does not employ the resistor 18 since it is possible to develop alternating-current potential across the resistor 19, due to the coupling capacitors 14 and 15, which corresponds with the alternating current developed in the secondary winding 13. The capacitors 14 and 15 actually serve as isolating capacitors to prevent the direct current supplied by the bias potential 53 from circulating through the transformer winding 13. The anodes of the vacuum tubes 16 and 17 are not connected to a bridge network. The grid of the vacuum tube 36 is coupled by a capacitor 60 with a common juncture between the resistors 26 and 27, and a resistor 61 is included between that juncture and ground. Since this common juncture between the resistors under conditions of unbalanced operation of the vacuum tubes 16 and 17 has an alternating-current potential relative to ground which is absent under balanced conditions, this potential may be applied by the coupling capacitor 60 directly upon the grid of the amplifier tube 36. In all other respects the circuit operation is the same.

While for the purpose of illustrating and describing the present invention there are shown in the drawings particular circuits, it is to be understood that the invention is not to be limited thereby since such variations may be made in the circuit arrangements in accordance with the principles set forth by the present invention as may be commensurate with the spirit and scope of the invention defined in the following claims.

What is claimed is:

1. A seismograph amplifier comprising a pair of vacuum tubes arranged in balanced circuit relation, grid-biasing means for applying between the respective signal grids and cathodes of said tubes a bias for operation of each tube at the same point on their respective characteristic curves, means including a resistor having a mid-portion connected to the cathodes of said tubes and the respective end portions connected to the signal grids of said tubes, a source of direct current potential connected to the respective end portions of said resistor to bias said tubes respectively in opposite senses and away from said point of said characteristic curves for raising the transmission level of seismic signals to a predetermined value by unbalancing said circuit relation, means including a second network responsive to output signals from said amplifier above a predetermined minimum level for applying a direct current biasing potential in opposition to said source of direct current potential simultaneously to change the bias on said tubes in directions for operation of each nearer said point on said characteristic curves to control the amplitude of the output signals.

2. A seismograph amplifier comprising a pair of vacuum tubes arranged in balanced circuit relation, grid-biasing means for applying between the respective signal grids and cathodes of said tubes a bias for operation of each tube at the same point on their respective characteristic curves, means including a resistor having a mid-portion connected to the cathodes of said tubes and the respective end portions connected to the signal grids of said tubes, a source of direct current potential connected to the respective end portions of said resistor to bias said tubes respectively in opposite senses and away from said point of said characteristic curves for raising the transmission level of seismic signals to a predetermined value by unbalancing said circuit relation, the output circuit of said vacuum tubes including a source of anode potential and a pair of similar resistors each connected to one of the anodes of said vacuum tubes, a bridge circuit having a first diagonal capacitively connected to the anode sides of said similar resistors, said bridge having a second diagonal, one end of which is connected to ground, and means including an amplifier having an input circuit connected to the other end of said second diagonal and responsive to output signals from said amplifier above a predetermined minimum level for applying a direct current biasing potential in opposition to said source of direct current potential simultaneously to change the bias on said tubes in directions for operation of each nearer said point on said characteristic curves to control the amplitude of the output signals, said bridge being adjustable to balance out any difference in anode currents due to characteristic curves for the respective tubes of different amplitude.

EDWIN J. SHIMEK.

REFERENCES CITED

The following references are of record in the file of this patent:

UNITED STATES PATENTS

| Number | Name | Date |
| --- | --- | --- |
| 2,244,695 | Hathaway | June 10, 1941 |
| 2,251,594 | Mayne | Aug. 5, 1941 |
| 2,255,683 | Singer | Sept. 9, 1941 |
| 2,294,200 | Norman | Aug. 25, 1942 |
| 2,318,795 | Peters | May 11, 1943 |
| 2,352,825 | Fay | July 4, 1944 |
| 2,354,420 | Minton | July 25, 1944 |
| 2,390,850 | Singer | Dec. 11, 1945 |